Dec. 13, 1955   C. J. RYANT, JR   2,726,882
ADJUSTABLE HIGH PRESSURE ROTATING SHAFT SEAL
Filed May 29, 1953   2 Sheets-Sheet 1

INVENTOR.
Charles J. Ryant, Jr.
BY
Everett A. Johnson
ATTORNEY

United States Patent Office 2,726,882
Patented Dec. 13, 1955

2,726,882

ADJUSTABLE HIGH PRESSURE ROTATING SHAFT SEAL

Charles J. Ryant, Jr., Chicago, Ill., assignor to Standard Oil Company, Chicago, Ill., a corporation of Indiana Application May 29, 1953, Serial No. 358,413

5 Claims. (Cl. 286—8)

This invention relates to seals and is particularly designed and adapted for use in connection with rotary shafts and for use in sealing such shafts against excessive leakage of high pressure fluids.

The use of packed stuffing boxes and glands for pressures of the order of 10,000 p. s. i. g. and higher is generally unsatisfactory. Furthermore, although shaft packing or stuffing box seals are generally sufficient at relatively low speeds, they are inadequate at high speeds such as 3,000 to 10,000 R. P. M. Soft packings usually do not wear long under high pressure and high speed whereas metallic foil packings seriously score the shaft being sealed. Both types usually involve high power losses to friction.

Heretofore, attempts have been made to avoid these difficulties by the use of close fitting bushing-type seals where clearances are so small as to hold leakage within reasonable limits. However, a serious problem with this type of seal is the extremely small clearances required between shaft and bushing which demand a quality of workmanship beyond the capabilities of the usual machine shop or service department.

It is, therefore, a primary object of this invention to provide a seal that is not subject to wide variations in clearances depending on small variations of manufacturing precision. It is a further object of the invention to provide a method and means for sealing a rotating shaft whereby variations in manufacturing precision can be compensated. An additional object is to provide a seal wherein the power loss due to friction would be less than for soft packing and with less likelihood of shaft overheating and seizure. It is also an object of my invention to provide a shaft seal which can be accurately and simply adjusted to maintain the desired clearance. These and other objects of my invention will become apparent as the description thereof proceeds.

Briefly, I attain the objects of my invention by providing a tapered bushing or collar through which a tapered shaft extends. The conical surface of the shaft and the correspondingly tapered surface of the collar are adapted to have bearing and liquid pumping engagement throughout substantially the entire length of the tapered collar. The surface of the tapered collar is parallel to the surface of the tapered shaft. Therefore, with the tapered shaft in position the clearance between tapered shaft and tapered collar will decrease when the tapered collar is moved axially until a point of no clearance is reached and the collar is resting on the tapered shaft. With a shaft and collar having a 2% taper this would mean that the collar would be moved axially 0.003 inch for each 0.0001 inch required from the zero clearance position. Thus, I attain a 30:1 ratio for any desired clearance to be obtained without having to resort to delicate measuring instruments.

My seal is of the leaking-bushing type wherein a fluid supply under pressure is introduced between the shaft and the tapered collar. There will be a tendency for the shaft to be forced by reactor pressure outwardly through the collar housing thereby keeping the tapered shaft surface and the correspondingly tapered collar at close clearance. If there is no objection to some leakage of the process fluid and if the process fluid has satisfactory lubricating properties, the seal against back leakage can be eliminated. In any event, any liquid (whether from a separate fluid supply or from the process vessel) between the tapered shaft and tapered collar is subjected to a "pumping action" by the relative rotation of the two surfaces. This causes or tends to cause the liquid between the surfaces to flow toward the larger end of the tapered shaft and hence the device effectively seals itself against excessive liquid leakage while providing satisfactory lubrication.

Additional details of the construction of my seal will be described in connection with the drawings wherein.

Figure 4:
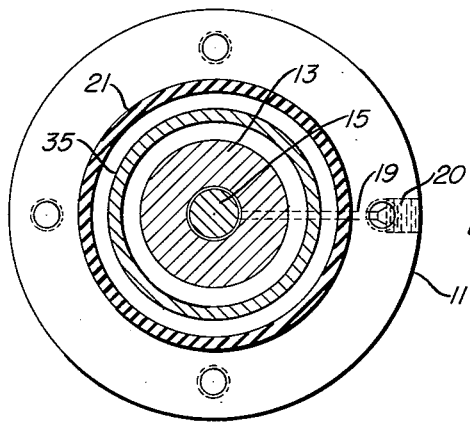
Figure 4 is a view taken along the line 4—4 in Figure 1.
Figure 1:
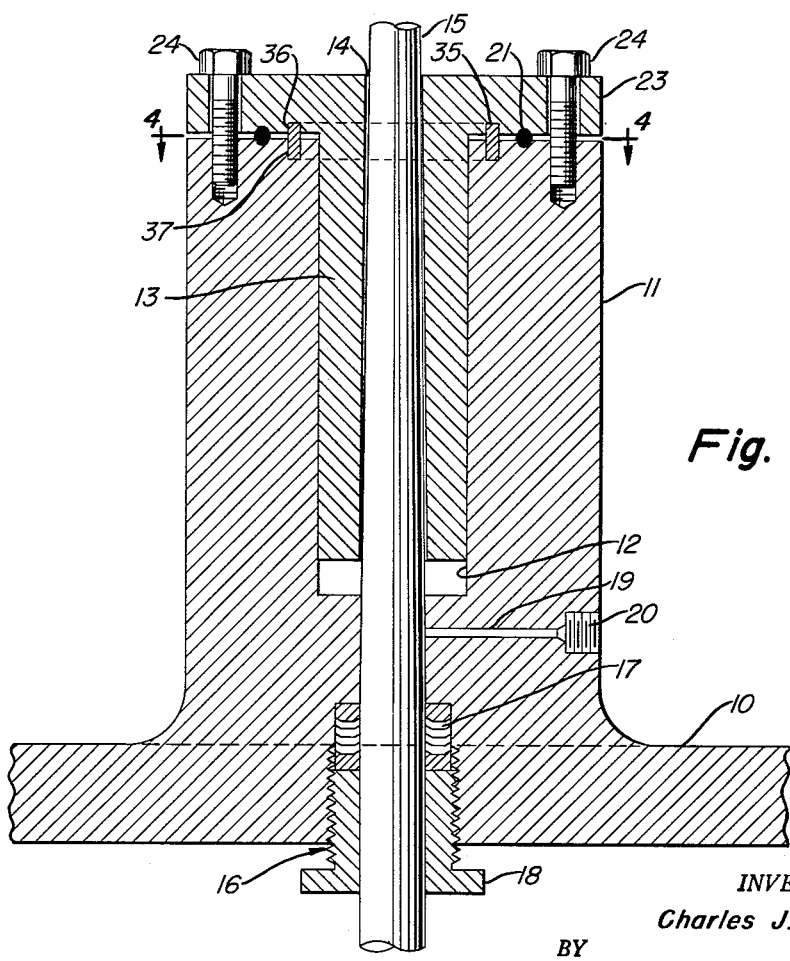
Figures 1 and 2 are elevations partially in section illustrating two modifications of my invention.
Figure 3:
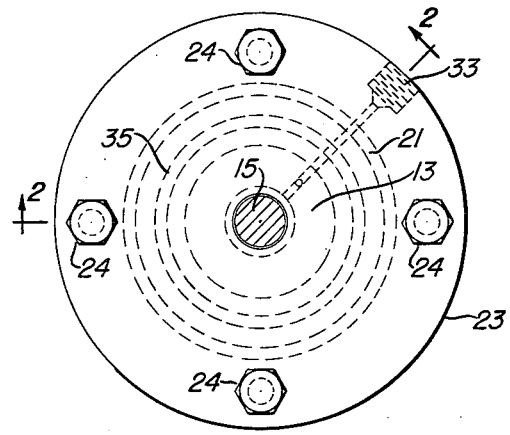
Figure 3 is a top plan view of the embodiment in Figure 2.
Figure 2:
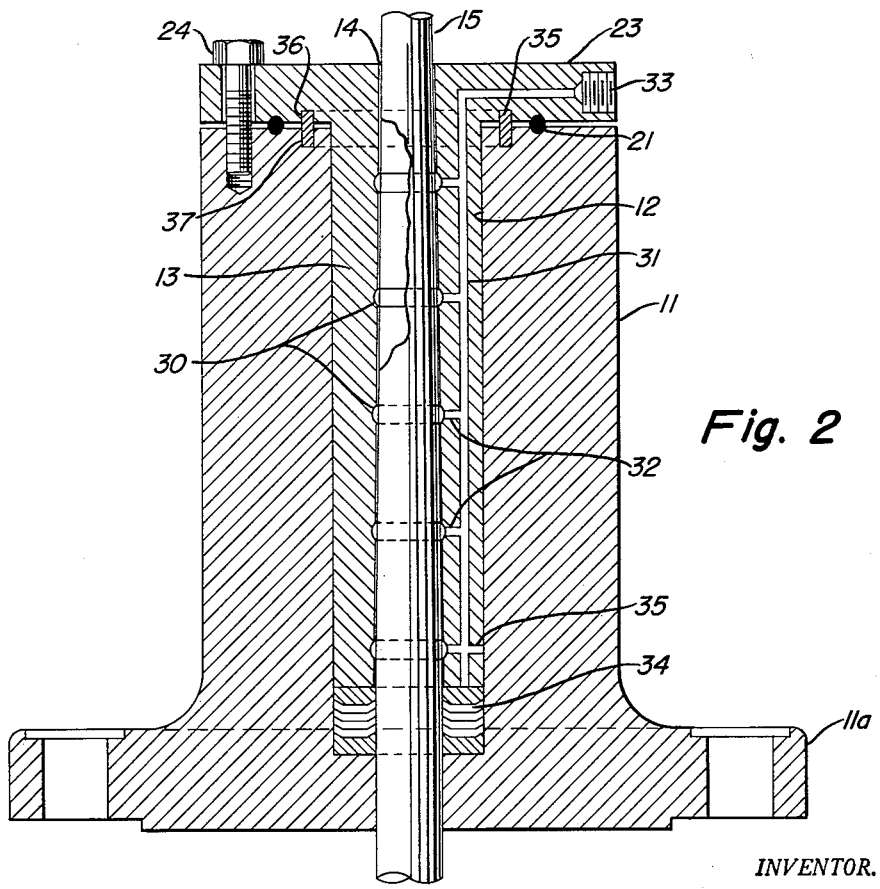

In Figure 1 of the drawing I have illustrated the invention as applied to a high pressure stirred autoclave having a collar housing 11 integral with the wall 10. In Figure 2 the housing 11 is provided with a flange 11a for attachment to a correspondingly flanged opening in a vessel.

In any event, the housing 11, whether integral or separable, is provided with an internal bore 12 to accommodate the bushing 13 having a tapered bore 14. The tapered shaft 15 passes through the wall 10 and into the tapered bore 14 in collar 13. A back leakage seal 16 about a portion of the shaft 15 includes a packing 17. In Figure 1, the packing 17 is held in place by gland nut 18 and in Figure 2, the packing 17 is held in place by the lower end of the tapered collar 13.

My seal requires an independent source of high pressure fluid in addition to the process fluid being sealed. One such source may be introduced at slightly above process pressure intermediate the back leagage seal 16 surrounding the shaft at its point of exit from the process vessel interior and the lower end of the tapered collar 13. This is illustrated in Figure 1. The sealing fluid so introduced via the radially extending inlet 20 leaks out between the tapered shaft 15 and the tapered bore 14 in collar 13. It is preferred that this fluid be a lubricant such as an oil. The inlet 20 is threaded to receive a fitting connected to a fluid pump system (not shown) and connects by duct 19 to bore 14.

A cap seal gasket 21 (which may be an O-ring) is provided between the upper end face of the collar housing 11 and the underside face of flange or cap 23. Flange or cap bolts 24 are provided to fix the tapered collar 13 within the collar housing 11 about the tapered shaft 12.

In a typical installation the collar housing 11 may be about 6 inches long and 4 inches in diameter. Shaft 15 may be about one inch in diameter and the tapered section have a 2% taper and about 5 inches long. To obtain the full advantage of the design it is necessary that the tapered portion of the shaft 15 and of the bushing 13 be from about 5 to about 12 times as long as the average diameter of the tapered portion of the shaft. For example, a tapered bushing 13 which is of a length of about 8 times the average diameter of the tapered shaft 15 may be used.

As illustrated in Figure 2, the elongated conical bore 14 in the bushing 13 can have a plurality of grooves 30 machined thereinto to provide an "oil ring" in which the tapered shaft 15 rotates. These grooves 30 can be placed along the tapered section of the bushing 13 at an axial spacing of about one shaft diameter. A plurality of inlet leak conduits 31 extend axially along the length of the wall of the bushing 13, each discharging through radial ducts 32 into the tapered bore 14. The sizes of the ducts 32 are varied so that there is an equal flow through each of them when fed from a constant pressure source through pressuring liquid inlets 33.

In Figure 2, I have illustrated but one system of inlet 33, distribution channel 31 and radial ducts 32 communicating with grooves 30. It is contemplated, however, that I may provide two or more of such systems so as to introduce the fluid separately to groups or pairs of grooves 30. Similarly, a plurality of distribution channels 31 may be fed by inlet 33 and discharged through a multiplicity of radial ducts 32 into grooves 30.

The distribution ducts 32 can extend downwardly into contact with the upper face of the packing 34 and another duct 35 can be provided to permit a controlled leakage or flow of fluid between the collar housing 11 and the exterior of the bushing 13. This flow is restricted by the O-ring gasket 21 between the collar housing 11 and the flange 23 on the bushing 13.

The spacer ring 35 permits one to preset the distance between the tapered shaft 15 and the tapered collar 13. A small spacer ring may be accurately machined on one of its flat sides and this is more precise than to machine the tapered shaft 15 and tapered collar 13 so that their surfaces are parallel. The spacer ring 35 can be in at least two forms, namely, a solid ring whose flat faces can be machined or a ring made up of laminations of rings, each layer corresponding to a known increase or decrease in the shaft-collar clearance. The use of such a spacer ring 35 in concentric channels 36 and 37 gives metal to metal contact between the flange 23 on the tapered collar and the face of the collar housing 11 which avoids installation of the tapered collar 13 in an off-center position.

The clearance in my shaft seal is adjusted by choosing a spacer ring 35 of sufficient height as to provide the desired clearance between the tapered elements 14 and 15. The gasket 21 concentric with the spacer ring 35 is placed between the end of collar housing 11 and the tapered collar flange 23 as illustrated. Further tightening of the flange bolts 24 causes the gasket 21 to deform and lower the tapered collar within the collar housing until it is supported by the spacer ring 35.

An advantage of my spacer ring includes the fact that if by some chance the tapered shaft 15 should wear then the desired clearance can again be obtained by substituting a spacer ring 35 of lesser height and thereby lower the tapered collar. The range of adjustability is such that the seal can be absolutely leakproof or can be made to leak a certain amount continuously to prevent any back flow into the high pressure reactor. For example, a continuous flow of approximately 4 cc. per hour will give adequate sealing and lubricating protection.

Although my invention has been described with reference to particular embodiments of an apparatus as applied to a rotating shaft in an autoclave, it will be apparent to those skilled in the art that in view of my descriptions the invention can be applied to any rotatable shaft and that changes may be made in the form of the apparatus without departing from the spirit of the invention illustrated in the drawings and described above.

What I claim is:

1. A pressure sealing shaft assembly including a housing about an opening through a portion of the wall of a processing vessel, a bushing disposed within said housing, a flange collar on said bushing, said bushing having an elongated conical bore, means for adjustably securing said bushing, a shaft extending through said bushing and provided with a conical surface parallel to and spaced from the surface of the conical bore, means for introducing a liquid under high pressure between said conical surfaces, a non-compressible spacer ring between said flange and said housing, and a compressible gasket means concentric with said spacer ring and having a normal height greater than the height of said ring whereby drawing down the bushing onto said spacer ring compresses the gasket means into liquid sealing contact and brings the elongated conical bore into a preset clearance with the conical surface of the shaft as determined by said spacer ring.

2. The pressure sealing shaft assembly of claim 1 wherein the elongated conical bore has a smooth surface.

3. The pressure sealing shaft assembly of claim 1 wherein the elongated conical bore is provided with a plurality of axially-spaced annular grooves.

4. The pressure sealing shaft assembly of claim 1 wherein the elongated conical bore is provided with a plurality of radially extending fluid ducts which terminate in a plurality of annular grooves which are axially spaced and means in connection with said radially extending fluid ducts for introducing fluid into said annular grooves.

5. An apparatus for sealing a rotating stirrer shaft on a high pressure autoclave which comprises in combination a collar housing supported by a wall of said autoclave, a bore through said housing adapted to accommodate a stirrer shaft, a second bore in said collar housing of greater diameter than said first bore providing an annular shoulder within said collar housing, a compressible packing on said shoulder, a tapered bushing collar within said second bore, a flange on said bushing collar, said bushing collar having a cylindrical outer surface corresponding to the surface of said second bore and having an internal tapered surface, a spacer ring disposed between the said flange and the said collar housing, said ring being arranged concentric to the stirrer shaft, a compressible gasket means between said collar and said flange, and bolt means adapted to draw said bushing collar downwardly within said collar housing so as to compress said gasket means into sealing contact and so as to bring the tapered bushing collar into a preset clearance with the tapered stirrer shaft as determined by said spacer ring.

References Cited in the file of this patent

UNITED STATES PATENTS

| | | |
|---|---|---|
| 1,614,120 | Halliwell | Jan. 11, 1927 |
| 2,137,328 | Bissell | Nov. 22, 1938 |
| 2,291,709 | Goetze | Aug. 4, 1942 |
| 2,453,055 | White et al. | Nov. 2, 1948 |
| 2,486,939 | Freund | Nov. 1, 1949 |
| 2,547,321 | Henderson | Apr. 3, 1951 |
| 2,654,364 | Hertrick | Oct. 6, 1953 |